(12) United States Patent
Simonds et al.

(10) Patent No.: US 7,505,168 B2
(45) Date of Patent: Mar. 17, 2009

(54) DISTRIBUTED CLIENT SIDE PRINTING METHODS AND SYSTEMS

(75) Inventors: Andrew R. Simonds, Newcastle, WA (US); Mark A. Lawrence, Kirkland, WA (US); Timothy J. Lytle, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 944 days.

(21) Appl. No.: 11/026,350

(22) Filed: Dec. 30, 2004

(65) Prior Publication Data

US 2006/0146360 A1 Jul. 6, 2006

(51) Int. Cl.
  G06F 15/00 (2006.01)
  G06F 15/16 (2006.01)
  G06F 3/06 (2006.01)
  G06F 17/00 (2006.01)

(52) U.S. Cl. ............... 358/1.16; 709/203; 709/220; 711/3; 715/203

(58) Field of Classification Search .......... 709/203, 709/209, 214, 221, 220; 711/3, 118; 715/203; 358/1.16, 1.17, 1.15
See application file for complete search history.

(56) References Cited

U.S. PATENT DOCUMENTS

| 2003/0115256 | A1* | 6/2003 | Brockway et al. ........... 709/203 |
| 2004/0049571 | A1* | 3/2004 | Johnson et al. ............. 709/224 |
| 2005/0213115 | A1* | 9/2005 | Johnson et al. ............. 358/1.1 |

* cited by examiner

Primary Examiner—Jerome Grant, II
(74) Attorney, Agent, or Firm—Lee & Hayes, PLLC (57) ABSTRACT

Various distributed client side printing methods and systems are described. In at least some embodiments, printer control and the job handling functions are bifurcated or separated by allowing jobs, drivers, settings and the like to be controlled by the print server or some other entity, while allowing clients to communicate jobs directly to a printer. The various embodiments can improve server performance by performing rendering and maintaining rendered data on the client side, and not communicating the rendered data to the server, while at the same time, allowing print servers to control the printer.

17 Claims, 3 Drawing Sheets

DISTRIBUTED CLIENT SIDE PRINTING METHODS AND SYSTEMS

TECHNICAL FIELD

This invention relates generally to printing systems and, more specifically, to client printing system and related methods.

BACKGROUND

Organizations are increasingly trying to consolidate printing into larger and larger print servers, and to remove these print servers from individual branch offices to a centralized location such as a data center. Print servers typically perform two main functions—that of printer control and job handling. Printer control typically includes, among other things, storing device settings, storing printing defaults, queuing and controlling print jobs, and controlling and vending printer drivers. Job handling typically includes, among other things, storing the print job on the server and communicating it to the printer.

Print servers typically queue the jobs that are sent to them and, in an enterprise setting, each job can typically be sent from a branch office over a slow WAN link. When it is time to print the print job, the print job is then typically sent back down the same slow link to a printer that may likely be located on the same subnet as the client. From a performance standpoint, it does not make sense to send a print job from the client to a print server, and then back from the print server to the client.

One solution to this problem might be to remove the print server from the system and allow clients to print directly to the nearest printer. This solution has a number of drawbacks. For example, some user of the printer would have to serve as an administrator in order to properly administer the printer. In addition, the local-only printer would not be listed in the Active Directory Service, which is a general purpose distributed database that can, for an enterprise, keep track of users, computers or anything that can be defined by a schema and which is not updated often. One of the things that the Active Directory can track across an enterprise are enterprise resources, such as printers.

Furthermore, configuration and drivers for multiple similarly-connected printers could not be easily centrally managed. For example, this arrangement would make it difficult if not impossible for administrators to manage print jobs across multiple, geographically-separated printers. Additionally and importantly, removing the printer server from the system may likely allow multiple clients to overwhelm the printer in the event too many attempts are simultaneously made to submit jobs (referred to as "device competition), or to poll the printer to obtain status changes.

SUMMARY

Various distributed client side printing methods and systems are described. In at least some embodiments, printer control and the job handling functions are bifurcated or separated by allowing jobs, drivers, settings and the like to be controlled by the print server or some other entity, while allowing clients to communicate jobs directly to a printer. The various embodiments can improve server performance by performing rendering and maintaining rendered data on the client side, and not communicating the rendered data to the server, while at the same time, allowing print servers to control the printer.

DETAILED DESCRIPTION

Overview

Various distributed client side printing methods and systems are described. In at least some embodiments, printer control and the job handling functions are bifurcated or separated by allowing jobs, drivers, settings and the like to be controlled by the print server or some other entity, while allowing clients to communicate jobs directly to a printer. The various embodiments can improve server performance by performing rendering and maintaining rendered data on the client side, and not communicating the rendered data to the server, while at the same time, allowing print servers to control the printer.

In at least some of the embodiments described below, the systems and methods utilize and build upon the technology described in U.S. patent application Ser. No. 10/337,115, entitled "Client Side Rendering of Printable Documents in a Network", filed on Jan. 6, 2003, the disclosure of which is incorporated by reference. It is to be appreciated and understood, however, that the inventive methods and systems described herein can be implemented independent of this technology, without departing from the spirit and scope of the claimed subject matter.

In accordance with at least one embodiment described below, a client is able to build and maintain a full persistent cache that is synchronized to the print server's configuration. In addition, a client can use the drivers maintained on the server to perform asynchronous rendering on the client, as well as spool data to the local machine before rendering.

In addition, the concept of a "shadow job" is introduced and corresponds to a print job that is created on the print server, and which has no corresponding job data. In some of the embodiments described below, a job synchronization component is utilized and is responsible for coordinating the jobs in a local cached queue on the client, with shadow jobs that are created and queued in a logical queue on the print server. As will be described in more detail below, the client spools the job to its local disk and then creates a shadow job on the server. The client, through the job synchronization component, monitors the jobs on the server through a notification protocol and maintains synchrony on the client. For example, if the job is deleted (as by an administrator) on the server, the job on the client is deleted. Other job controls such as pause and resume are similarly handled. When the client loses communication with the server, the client falls back to behaving like a disconnected client. When the job starts printing on the server, the client sends the job data directly to the printer.

This allows a logical job queue to be maintained by the server without the server having to actually receive or process the job data. What this means is that, in at least some embodiments, print job data is not communicated to the print server, but rather is maintained, rendered and printed at the client.

In addition, at least some of the embodiments described below can utilize a direct connection between the client and the printer. The client, through mechanisms described below, replicates the information from the server on how to connect to the printer. This information includes, in at least some embodiments, a printer's IP address and port, and whether the printer supports SNMP (Simple Network Management Protocol) or LPR (Line Printer—a UNIX printing protocol) and if so, in which modes. With this information, the client can create a port with the same configuration and can, through this port, maintain a direct connection to the printer using the configuration information from the server.

Exemplary Operating Environment

Before describing aspects of the distributed client side printing embodiments, the following discussion of an exemplary client device is provided to illustrate an exemplary device in connection with which one or more of the described embodiments can be implemented. It is to be understood that the description provided below constitutes but one example and is not intended to limit application of the claimed embodiments to any one particular client device.

Figure 1:
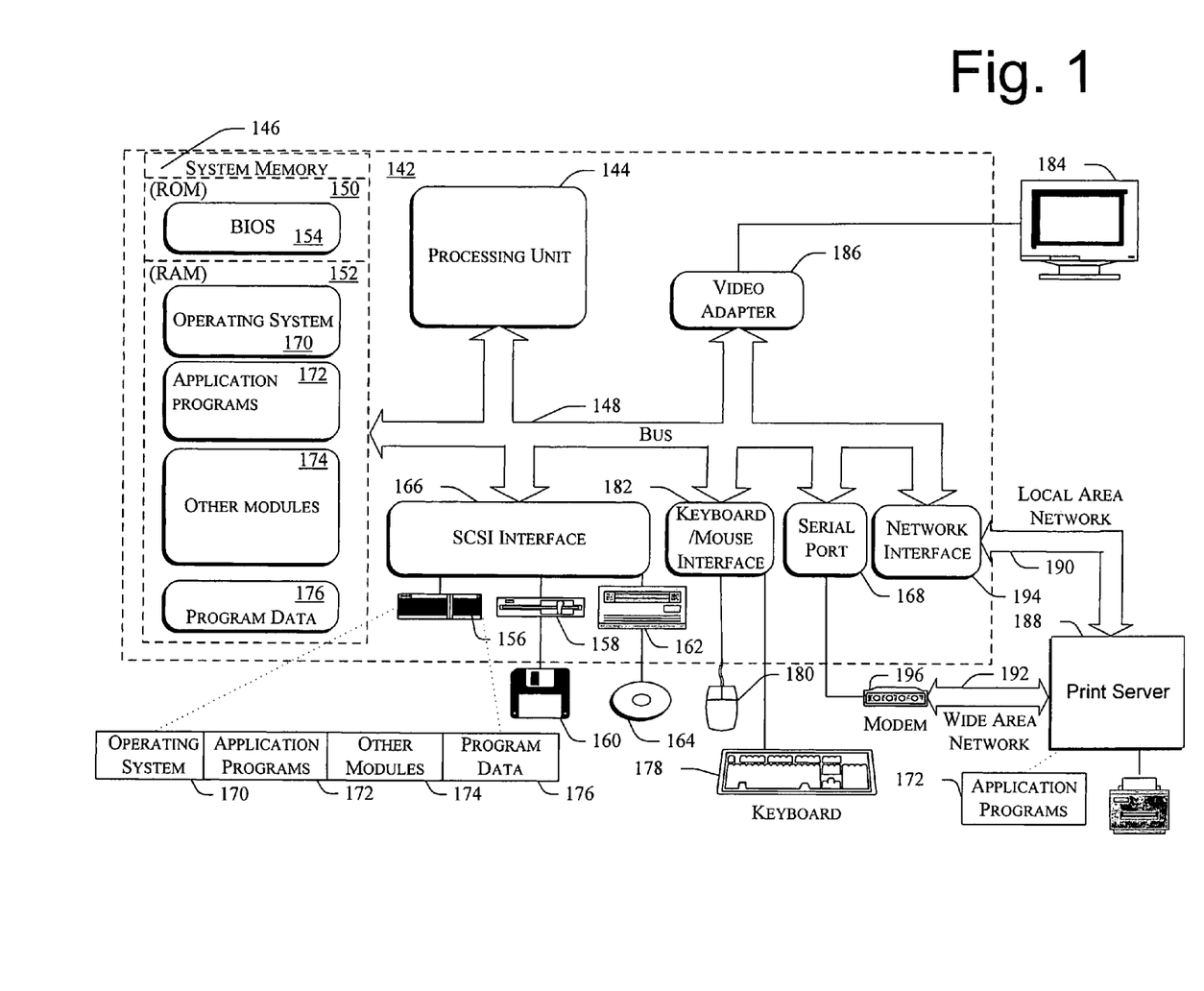
FIG. 1 is a block diagram of an exemplary client computing device in connection with which one or more of the described embodiments can be implemented.

FIG. 1 shows an exemplary client computing device that can be used to implement the processes described below. Computing device 142 comprises one or more processors or processing units 144, a system memory 146, and a bus 148 that couples various system components including the system memory 146 to processors 144. The bus 148 represents one or more of any of several types of bus structures, including a memory bus or memory controller, a peripheral bus, an accelerated graphics port, and a processor or local bus using any of a variety of bus architectures. The system memory 146 comprises read only memory (ROM) 150 and random access memory (RAM) 152. A basic input/output system (BIOS) 154, containing the basic routines that help to transfer information between elements within computing device 142, such as during start-up, is stored in ROM 150.

Computing device 142 can further comprise a hard disk drive 156 for reading from and writing to a hard disk (not shown), a magnetic disk drive 158 for reading from and writing to a removable magnetic disk 160, and an optical disk drive 162 for reading from or writing to a removable optical disk 164 such as a CD ROM or other optical media. The hard disk drive 156, magnetic disk drive 158, and optical disk drive 162 are connected to the bus 148 by an SCSI interface 166 or some other appropriate interface. The drives and their associated computer-readable media provide nonvolatile storage of computer-readable instructions, data structures, program modules and other data for computer 142. Although the exemplary environment described herein employs a hard disk, a removable magnetic disk 160 and a removable optical disk 164, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 156, magnetic disk 160, optical disk 164, ROM 150, or RAM 152, including an operating system 170, one or more application programs 172 (such as a user agent or browser), other program modules 174, and program data 176. A user may enter commands and information into computer 142 through input devices such as a keyboard 178 and a pointing device 180. Other input devices (not shown) may comprise a microphone, joystick, game pad, satellite dish, scanner, or the like. These and other input devices are connected to the processing unit 144 through an interface 182 that is coupled to the bus 148. A monitor 184 or other type of display device is also connected to the bus 148 via an interface, such as a video adapter 186. In addition to the monitor, personal computers typically comprise other peripheral output devices (not shown) such as speakers and printers.

Computer 142 commonly operates in a networked environment using logical connections to one or more remote computers, such as a print server 188 which, in turn, is connected to one or more printers. The print server 188 may be another personal computer, a server, a router, a network PC, a peer device or other common network node, and typically comprises many or all of the elements described above relative to computer 142. The logical connections depicted in FIG. 1 comprise a local area network (LAN) 190 and a wide area network (WAN) 192. Such networking environments are commonplace in offices, enterprise-wide computer networks, intranets, and the Internet.

When used in a LAN networking environment, computer 142 is connected to the local network through a network interface or adapter 194. When used in a WAN networking environment, computer 142 typically comprises a modem 196 or other means for establishing communications over the wide area network 192, such as the Internet. The modem 196, which may be internal or external, is connected to the bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The system described herein comprises these and other various types of computer-readable storage media when such media contain instructions or programs for implementing the blocks described, in conjunction with a microprocessor or other data processor. The system described can also comprise the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Distributed Client Side Printing System

Figure 2:
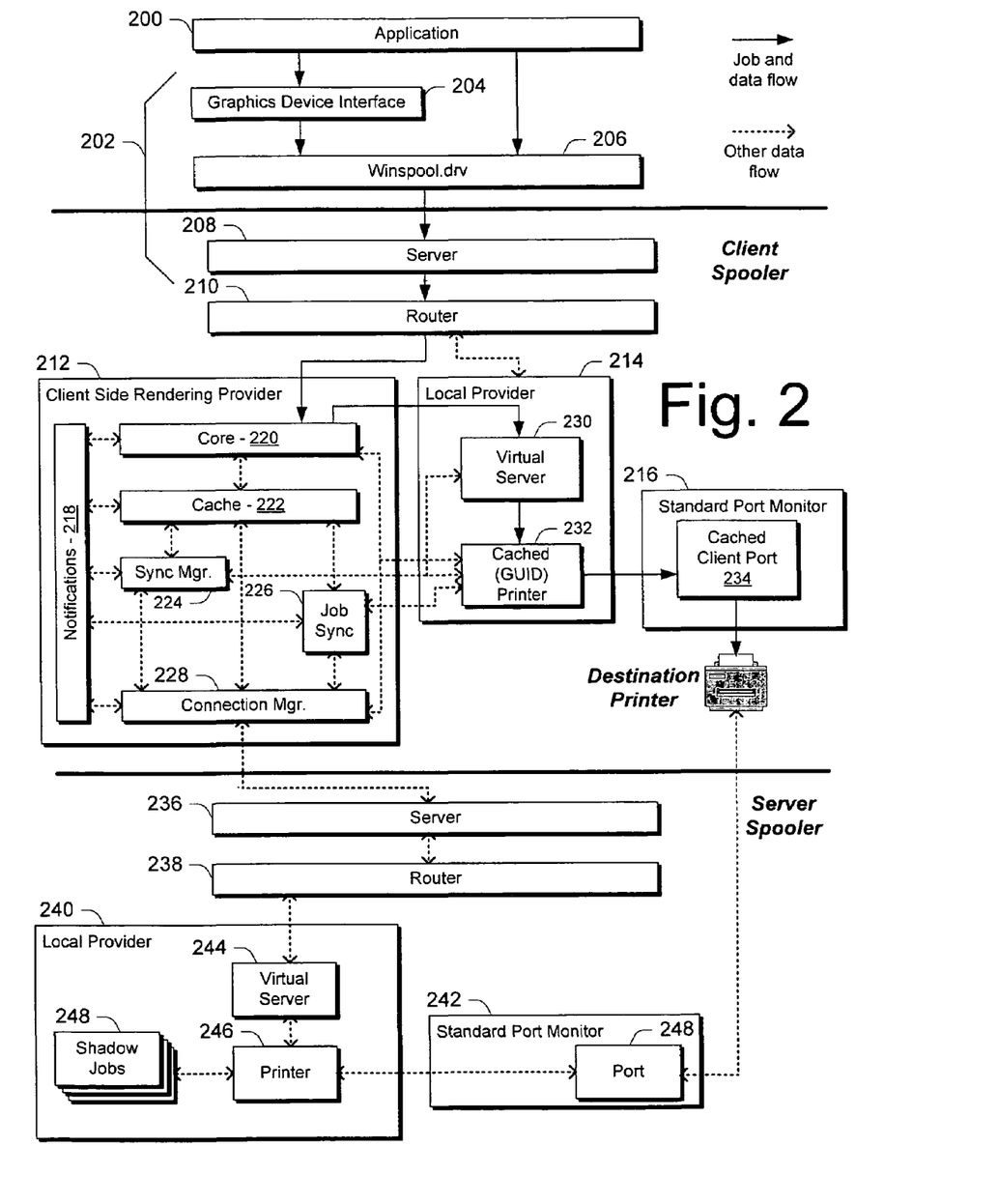
FIG. 2 is a block diagram of an exemplary software architecture that can be utilized, in accordance with one embodiment, to implement the inventive processes described herein.

FIG. 2 illustrates an exemplary software architecture, in accordance with one embodiment, that is configured to implement distributed client side printing. Preliminarily, two different data flows are depicted in the figure. A first of the data flows, depicted by the solid line, depicts the flow of the print job and its associated data—such as rendered print job data; a second of the data flows, depicted by the dashed line, depicts the flow of so-called other data. This other data can comprise control data or information such as configuration information, security information, print defaults and the like. This other data does not include rendered print job data. Notice in the figure that the print job data (the flow of which is indicated by the solid line) does not leave the client. Rather, the print job data is processed, rendered and printed on and by the client side device and printer. Control data from the print server, however, is received by the client device and is utilized to set up, maintain and synchronize a printing environment or system on the client device, with one that exists on the print server, as will become more apparent below.

In the FIG. 2 embodiment, an application 200, such as a word processing or spreadsheet application, runs in the user-level and enables a user to interact with and effect printing of a document. In the illustrated and described embodiment, the application 200 interacts with a print subsystem level 202 which includes various components that process a document that is to be printed. Print subsystem level 202 can include various components such as a graphics device interface component 204, a Winspool.drv component 206 and a server component 208. In this embodiment, the server component is responsible for providing a network interface or other remote procedure interface to a router component 210. Logically, the entire client is a print server that is accessed only by applications on the same machine.

Collectively, in at least some embodiments, components at the print subsystem level 202 working in concert with application 200 can provide the functionality that is utilized to translate application-specific document data into an intermediate data format, and transfer the newly formatted document for further processing, as will be appreciated by the skilled artisan. After the application-specific data has been translated into an intermediate data format, components of the print subsystem level 202 can forward the document to a printing router 210. In this embodiment, the printing router 210 is responsible for routing APIs to the correct plug-in component referred to as a "print provider". The print provider, in turn, provides the abstraction of a printer by implementing the appropriate printing APIs. In the FIG. 2 example, the client side rendering provider 212 and local provider 214 are two examples of a print provider. In this example, the client side rendering provider 212 provides for connections to a print server and the local provider 214 provides support for the local printers (such as the destination printer illustrated in the figure), as will become apparent below.

In the illustrated and described embodiment, the destination printer can comprise a printer that is connected to the client and a print server in a manner that permits the client to render and print a particular document without necessarily communicating the rendered data to the print server. At the same time, the connection with the print server allows the print server to control the printer, for example, through an administrator. One embodiment of such a connection is a network connection such as an Ethernet connection.

One means of implementing this functionality is described just below. It is to be appreciated and understood that the description that follows is not intended to limit application of the claimed subject matter. Rather, other implementations can be utilized without departing from the spirit and scope of the claimed subject matter.

Client Spooler

In the illustrated and described embodiment, a client spooler level embodied on a client device, such as the one shown and described in FIG. 1, comprises a client side rendering provider 212, a local provider 214 and a standard port monitor 216, each of which is separately discussed under its own heading below.

Client Side Rendering Provider

In the illustrated and described embodiment, client side rendering provider 212 comprises a notifications component 218, a core component 220, a cache component 222, a synchronization manager component 224, a job synchronization component 226 and a connection manager component 228.

In one embodiment, notifications component 218 serves to help reduce direct coupling between components within client side rendering provider 212. As such, a data flow connection can be seen to reside between the notifications component and various other components such as the core component 220, cache component 222, synchronization manager component 224, job synchronization component 226 and the connection manager component 228. In this embodiment, all communication not explicitly shown by the dotted or solid lines occurs through the notifications component 218.

Core component 220 is responsible for implementing a print provider interface. Core component 220 coordinates establishing the printer connections and populating the initial state of the cache component 222 through the synchronization manager component 224. The core component is also responsible for satisfying the print provider (e.g. client side rendering provider 212 and local provider 214) APIs from data in the cache, in the cached printers in the local provider 214 and, if necessary, from the remote server through the connection manager component 228. The core component is also responsible for routing jobs to the cached printers in the local provider discussed in more detail below.

The cache component 222 comprises an abstract hierarchical store that stores dynamic cache information pertaining to each user connection. The cache component also stores other dynamic objects, such as the connections maintained by the connection manager component 228. In the illustrated and described embodiment, any configuration stored on the server for a printer is cached, for example, the name, location, comment associated with the printer, which driver it uses, what print processor it uses etc. In addition some data is only stored in the per-user cache and is not from the server. For example, the user can have their own comment field distinct from the comment supplied by the administrator from the server. The cache can also store the relationship between the cached user data and other data like which cached virtual server each client connection corresponds to.

The synchronization manager component 224 is responsible for maintaining the state of the cache component 222 so that the cache component remains synchronized with the state on the server. The synchronization manager also updates the cached printer and the cached printers in the local provider 214, as well as some per-server state such as forms and the like. In addition, the synchronization manager is configured to read printer data keys from the server. One printer data key is used to enable direct client printing from the client. Hence, if this particular key is set to a pre-defined value, then the synchronization manager component enables direct client printing from the client.

The synchronization manager component 224 can create a port that is configured to print to the same printer as the corresponding port on the server. Specifically, the synchronization manager can create a port with the same configuration as the port on the server. Additionally, the synchronization manager can see to it that the client configuration can be synchronized to the configuration on the server (e.g. if the server's configuration changes). It can then disable SNMP support to prevent the clients from polling the printer for status. Additionally, the synchronization manager component also configures the GUID printer (in local provider 214) to print via this cached port (in the standard port monitor 216). Additionally, if the configuration on the server queues changes from direct client printing to normal queued printing, the synchronization manager component will change the cached printer to go through that port, and delete the cached port. The synchronization manager component will perform the reverse sequence if the queue changes back again.

The job synchronization component 226 is responsible for coordinating the print jobs in the local cached queue with shadow jobs that it creates on the server. The shadow jobs are placed into a logical queue on the print server and serve as place-holders for the jobs on the client. The shadow jobs in the logical queue are used as a mechanism to maintain synchrony between processing that takes place on the print server, and processing that takes place on the client device, as will become apparent below.

In accordance with one implementation example, the job synchronization component 226 can work in the following way. On start up, the job synchronization component enumerates all of the jobs in the local queue and pause the jobs. In this particular implementation example, it only does this if the cached state indicates that this print queue is performing direct client printing. The job synchronization component is notified of any arriving jobs by the core component 220. The core component 220 will submit any jobs to the cached queue in a paused state. For every job in the local queue, the job synchronization component creates a printer handle on the server, and calls a method StartDocPrinter (to create a job on the server) on it, which creates a shadow job on the server. The job synchronization component 226 maintains a mapping between job IDs in the client queue and the job IDs of the shadow jobs that it creates on the server.

In accordance with this implementation example, the print queue on the server (referred to as the logical queue) must be configured with "Print While Spooling" enabled. Even though the job is empty and is held by the client, it will be scheduled to print. If the client terminates because the job was not completed, the job will automatically be deleted from the server.

If any jobs are held in the cached printer queue on the client, the job synchronization component 226 listens for printer status, job status and ID changes on the corresponding logical queue on the server.

In addition, in accordance with this implementation example, the job synchronization component 226 can perform the following actions, among others, to maintain synchrony between the print job processing that takes place on the print server, and the print job processing that takes place on the client device.

If the server queue is purged, the job synchronization component deletes all the jobs in the client queue. If a job on the server is deleted without going to the "Printed" state, the corresponding job on the client is deleted. If a job on the server goes to the "Printing" state, the corresponding job in the client queue is un-paused and is allowed to print. When the job is completed, the job synchronization component finally calls EndDocPrinter and ClosePrinter on the server printer handle held for the job. The EndDocPrinter call corresponds to the StartDocPrinter call and notifies the server that the job is now complete. This causes this job to complete on the server and allows the next job to print. If a user pauses a job in the client queue, the job synchronization component causes the job on the server to be set to "paused". The job synchronization component can be informed of this from the core component 220 via the notifications component 218. More specifically, in this implementation example, the core component is called with SetJob when the user pauses the job. Similarly, if an administrator pauses the job on the server, the client job is set to paused. If the server goes offline, the jobs in the client queue are un-paused and all of the handles to the server are closed. This allows the client queue to start sending the jobs to the device when the server is unavailable. When the server goes back online again, the job synchronization component again pauses all of the jobs, listens for change notifications, and re-creates the shadow jobs on the print server. If notifications overflow or are lost, the job synchronization component recreates the notification channel. If the job on the server is no longer present, the job on the client is deleted. This approach recognizes that the job synchronization component 226 knows that it has the corresponding handle open and hence if the job is gone, the job must have been deleted from the server.

Connection manager component 228 abstracts away protocols from the components of the print system and is also responsible for monitoring all calls to the server for success or failure. The connection manager component then determines whether their failure code indicates that the server is now offline. If the server is offline, the connection manager component fires a notification to the other components and starts up another component (not shown) which listens for local network media notifications and polls the offline servers to determine when the server becomes available again.

Local Provider

Local provider 214 comprises, in this example, two components—a virtual server component 230 and a cached (GUID) printer component 232.

Virtual server component 230 (which can actually include multiple virtual servers) is maintained by the local provider 214 and constitutes a set of virtual servers that are created by client side rendering provider 212. Each virtual server corresponds to a server to which a user has a connection. The virtual server caches some information (such as form data) and also maintains the client side cached printers 232 (also referred to as GUID printers because each one has a Globally Unique ID).

Cached printer component 232 is analogous to a fully functional, but hidden printer. The cached printer component has its own queue, can schedule and render jobs, stores configuration data for the driver, and the like. The cached printer component has a corresponding port (identified by the same GUID that it uses) maintained by a CSR Monitor (not specifically shown in the illustration). This port receives any jobs sent to the GUID printer after they have been rendered.

Standard Port Monitor

Standard port monitor 216 comprises a cached client port component 234. The standard port monitor is configured to respond with success in StartDocPort (called by the Spooler to notify the monitor that a document is about to be printed), WritePort (called repeatedly to transfer the document data) and EndDocPort (notifies the monitor that the document is complete) if a particular print parameter was present in the job. The cached client port 234 is analogous to the port maintained on the server and is configured to maintain synchrony with the server's port.

Server Spooler

In the illustrated and described embodiment, a server spooler level comprises components that include a server 236, a router 238, a local provider 240 and a standard port monitor 242. Server 236 serves as the communication interface with connection manager component 236 in the client side rendering provider 212. Router 238 operates to route information communicated from the server 236 to the appropriate local provider 240.

Local provider 240 comprises, in this implementation example, a virtual server component 244, a printer component 246 and a shadow jobs component 248. The virtual server component 244 operates in the manner described with respect to virtual server 230 on the client side. Printer 246 operates in the manner described with respect to cached printer 232 on the client side.

Shadow jobs component 248 comprises the individual shadow jobs that are created by the job synchronization component 226 on the client side rendering provider 212.

Standard port monitor 242 comprises one or more ports 248 and operates in a similar manner as standard port monitor 216.

In Operation

In operation in accordance with this specific implementation example, when an application, such as application 200, wishes to print a document, the application calls into Winspool.drv component 206 which provides a set of APIs that encapsulate the spooler's behavior. Winspool.drv component 206 then communicates with the client spooler level and requests a list of printers. The server/router components 208, 210 communicate with client side rendering provider 212 which then enumerates all of the printers back to application 200 so that the application can be used to select a particular printer for printing.

Application 200 then typically communicates with graphics device interface 204 and targets a particular printer. Graphics device interface 204 then calls Winspool.drv 206 to ascertain information associated with the local client systems, such as an associated driver that is to be used, where the driver files are located, and the like. In addition, Winspool.drv 206 communicates with the associated driver as will be appreciated by the skilled artisan.

Typically then, application 200 begins writing graphics primitives into the graphics device interface 204 which, in turn, communicates job-associated data to the client side rendering provider 212. More specifically, in this particular implementation example, the graphics primitives get recorded by the graphics device interface in an enhanced metafile format referred to as EMF. EMF essentially provides a set of instructions that draw primitives and, to this extent, can be considered as an intermediate page description language. The EMF is then sent to the client side rendering provider 212 for further processing.

In the process of creating a connection, the client side rendering provider 212 creates a virtual server object (i.e. virtual server 230) and a virtual printer object (i.e. cached printer 232). A "connection" refers to the logical notion that the printer maintained by the client side rendering provider 212 is really connected to the local provider. It appears differently to a user in the user interface and behaves differently (for example, the user cannot typically change its properties, they are synchronized to the server's state).

The client side rendering provider 212 then redirects, via core component 220, the EMF to the virtual server 230 and local spool, which then writes the data out to a spool file.

At this point in the above-described process, an EMF job or print job has been recorded in the cached printer and the client side rendering provider 212 communicates with the server to begin the synchronization process. More specifically, in this implementation example, job synchronization component 226 notices that there has been a new job created on the local provider 214. Accordingly, job synchronization component 226 communicates, via connection manager 228, with the server spooler level on the print server side and tells the server's local provider 240 to create a logical job, also referred to as a shadow job 248.

Job synchronization component 226 is then responsible for logically tying the shadow job on the server with the job on the client. In the implementation example, the job synchronization component does this by registering for change notifications on the logical queue in the local spool. The change notification mechanism allows the server to asynchronously communicate any information changes associated with jobs queued up at the server. For example, when a particular job ID (which corresponds to a shadow job that was created) changes its state, this information is communicated to the job synchronization component 226 which can then take appropriate steps to synchronize the job on the client side. Some examples of state changes and how state changes are synchronized are given above. So, for example, if a shadow job's state is changed to a printing state, this tells the job synchronization component that the server has logically started printing the job. Accordingly, the job synchronization component can then use this information to synchronize printing on the client. In this particular implementation example, this causes the job synchronization component to unpause the corresponding job on the client which, in turn, allows the cached printer 232 in the local provider 214 to start processing the print job.

At this point, consider a couple of things that this synchronization process accomplishes. First, the synchronization process allows an administrator to actually see a job's flow in the logical queue on the server. Thus, the administrator is provided with the ability to take any necessary or desired actions with regards to jobs that are logically queued up at the printer. Second, the synchronization process and the logical queue that is maintained at the server help to mitigate problems associated with device competition because the logical queue serializes access to the printing device at the client.

When the print job (which in this example is the EMF job) is processed for printing on the client in synchrony with the activities that take place on the server, the EMF job is processed by the local provider 214 which then communicates through graphics device interface 204 to the driver. The driver, in turn, communicates to the local spool or client side rendering provider 212 which then communicates with the standard port monitor 216 which maintains a cached client port 234 which replicates the port state of the server which processes the print job. The print job is then routed to the illustrated printer for printing.

Exemplary Method

Figure 3:
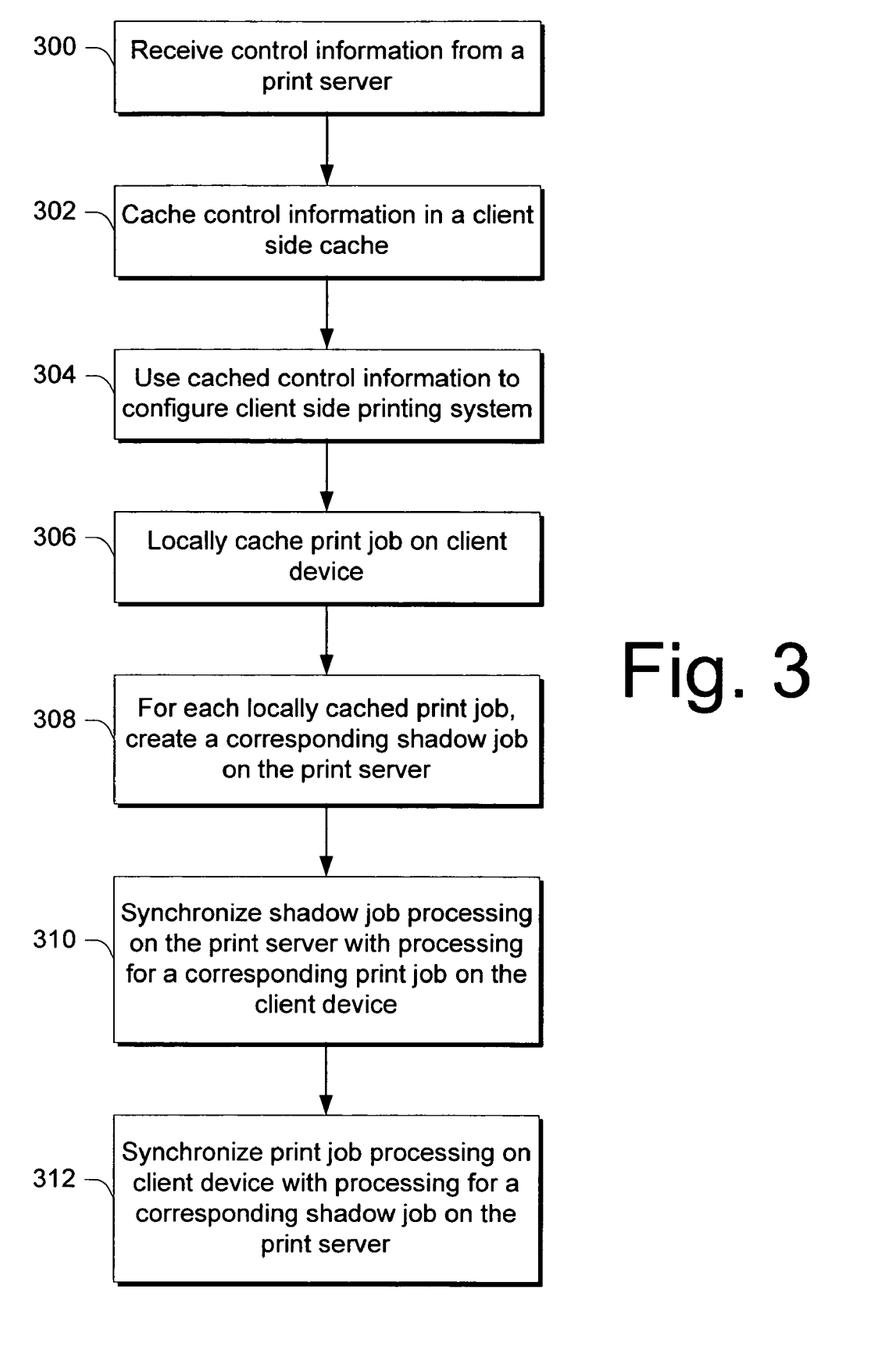
FIG. 3 is a flow diagram that describes a method in accordance with one embodiment.

FIG. 3 is a flow diagram that described steps in a method in accordance with one embodiment. The method can be implemented in any suitable hardware, software, firmware or combination thereof. In but one embodiment, the method can be implemented in software using an architecture such as the one described above in FIG. 2. It is to be appreciated and understood that the method can be implemented using other architectures that are different from the FIG. 2 architecture without departing from the spirit and scope of the claimed subject matter.

Step 300 receives control data or information from a print server. This step can be performed in any suitable way and can comprise any suitable control information including, without limitation, configuration information, print driver information, settings information, security information, port configuration information and the like.

Configuration information can include the name, location and comment associated with the printer, the type of driver and print processor to use, the type of document that a print job should be assumed to be if it is not otherwise specified (known as the default data-type).

Print driver information can include the default number of copies to make for a print job, how many sides to use on a piece of paper, whether the output should be collated or stapled, how many application pages to print on one physical page (1-Up, 2-Up, 4-Up, 9-Up or 16-Up). The print driver information can be modified by a user and is associated also with each job. The default print driver information is associated with the queue.

Settings information can include how much RAM the printer has installed, whether it has a duplexer, what fonts are installed on the printer, and how application fonts should be mapped to fonts that are supported directly by the printer etc.

Security information can include the list of users and groups that are allowed to use the printer (or are explicitly barred from using the printer) and what privileges they have or are explicitly disallowed. For example, one user or group might be allowed to print a document but not subsequently manage (pause, delete or resume) it. Another user or group might be allowed to manage the job, but only their jobs, and cannot change the configuration of the printer. Yet another user or group might be able to change settings, submit jobs and manage them.

Port configuration information can include the name or IP address of the printer, the port on which the client should communicate, whether the printer supports SNMP, how many physical printers are supported by the same name or IP address. If the printer supports LPR and, if it supports LPR, the logical queue name of the printer on the LPR server.

Step 302 caches the control information in a client side cache. One example of a client side cache is given above. Step 304 uses cached control information to configure a client side printing system. For example, the control information can be used to create and configure an associated client side port, access and load appropriate drivers, promulgate security settings, set up permissions and the like.

Step 306 locally caches a print job on the client device. This step can be performed responsive to a user, via an application, indicating that they wish to print a document. Step 308 creates, for each locally cached print job, a corresponding shadow job on the print server. One example of how this can be done is given above.

Once a corresponding shadow job has been created on the print server, step 310 synchronizes shadow job processing on the print server with processing for a corresponding print job on the client device. Step 312 synchronizes print job processing on the client device with processing for a corresponding shadow job on the print server. Examples of how this can be done are given above. It is to be appreciated and understood that steps 310 and 312 need not be performed serially. Rather, steps 310 and 312 can be performed concurrently to ensure that user actions on the client side (such as pausing a print job) affect processing at the print server, and actions on the print server side (such as an administrator deleting a job) affect processing on the client side.

Extensions

The approaches above lend themselves to extensions that can be crafted along the following lines. First, the control data and information that is utilized by the client device to synchronize to a particular print server need not necessarily emanate from, or be maintained by the print server itself. Rather, the information could be embodied in a data store of some type. In addition, the data store need not be maintained on a single machine. Rather, the data store can comprise a replicated node, a replicated SQL database and the like.

In addition, in those embodiments where the control or configuration is not maintained on a single server, the client can utilize some other mechanism to maintain the logical queue. For example, the client might employ a token algorithm, such as one that is similar to ones used by a token ring network, to maintain the logical queue. In addition, the print server might, in at least some embodiments, be entirely removed from the system, with the logical configuration and logical store being maintained between a set of operating clients.

CONCLUSION

In various embodiments described above, printer control and the job handling functions are bifurcated or separated by allowing jobs, drivers, settings and the like to be controlled by the print server, while allowing clients to communicate jobs directly to a printer. The various embodiments can improve server performance by performing rendering and maintaining rendered data on the client side, and not communicating the rendered data to the server, while at the same time, allowing print servers to control the printer. In addition, in at least some embodiments, logical queues maintained on the print server can mitigate device competition issues by serializing access to the client side printer.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   establishing, with a client device, a connection between the client device and one or more entities from which print server configuration data can be received;
   receiving, by the client device, control data associated with the print server;
   using the control data to configure the client device for print-related activities;
   processing a print job on the client device to render job-related data; and
   causing the job-related data to be printed on a printer that is communicatively linked with both the client device and the print server, without communicating rendered data to the print servers,
   wherein the act of processing the print job includes processing multiple print jobs by:
      maintaining a local queue of the print jobs on the client device;
      maintaining a logical queue of corresponding print jobs; and
      synchronizing printing-related activities associated with print jobs in the local queue and print jobs in the logical queue.

2. The method of claim 1, wherein the act of establishing comprises establishing a connection with the print server, and the act of receiving comprises receiving the control data from the print server.

3. The method of claim 1 further comprising maintaining, on the client device, a persistent cache that is synchronized to the print server's configuration.

4. The method of claim 1, wherein the act of maintaining the logical queue is performed by maintaining the logical queue on the print server.

5. The method of claim 1, wherein the act of establishing comprises establishing a direct connection between the client device and the printer.

6. One or more computer-readable media embodying computer-readable instructions which, when executed, implement a software architecture configured to implement the method of claim 1.

7. A method comprising:
establishing a connection between the client device and a print server;
sending, with the print server, control data to the client device for configuring the client device for print-related activities;
responsive to receiving a communication from the client device, establishing on the print server a logical queue containing at least one print job that corresponds to a print job that is queued locally on the client device; and
providing notifications to the client device associated with printing-related activities that take place relative to the print job in the logical queue, wherein said notifications are directed to enabling the client device to render print job-related data and print rendered data on a connected printer without having to communicate rendered print job data to the print server,
wherein the act of providing notifications to the client device permits the client device to synchronize printing-related activities associated with print jobs in the local queue and print jobs in the logical queue.

8. The method of claim 7, wherein the act of sending permits the client device to maintain a persistent cache that is synchronized to the print server's configuration.

9. The method of claim 7, wherein the print jobs contained in the logical queue comprise shadow jobs having zero length.

10. A method comprising:
receiving control data from a print server;
caching the control data in a client side cache;
using the control data to configure a client side printing system;
locally caching one or more print jobs on the client device;
for each locally cached print job, causing creation of a corresponding zero length shadow job on the print server, wherein the shadow job serves as a placeholder for its corresponding locally cached print job; and
synchronizing shadow job processing on the print server with processing for a corresponding locally cached print job.

11. The method of claim 10, wherein the control data can include one or more of configuration information, printer driver information, settings information, security information, or port configuration information.

12. The method of claim 10, wherein the act of using the control data comprises creating or configuring a client side port so that its configuration matches a configuration of a print server side port.

13. The method of claim 10, wherein said act of synchronizing comprises enabling a print job to be processed and rendered on the client device, without communicating rendered print job data to the print server.

14. The method of claim 10, wherein the act of using is performed, at least in part, by a synchronization manager component.

15. The method of claim 10, wherein said act of synchronizing is performed, at least in part, by a job synchronization component.

16. The method of claim 10, wherein said recited acts are performed, at least in part, by a client side rendering provider.

17. One or more computer-readable media embodying computer-readable instructions which, when executed, implement a software architecture configured to implement the method of claim 10.

* * * * *

UNITED STATES PATENT AND TRADEMARK OFFICE
CERTIFICATE OF CORRECTION

PATENT NO. : 7,505,168 B2  
APPLICATION NO. : 11/026350  
DATED : March 17, 2009  
INVENTOR(S) : Andrew R. Simonds et al.

Page 1 of 1

It is certified that error appears in the above-identified patent and that said Letters Patent is hereby corrected as shown below:

In column 12, line 41, in Claim 1, delete "servers," and insert -- server, --, therefor.

Signed and Sealed this
Tenth Day of May, 2011

David J. Kappos
*Director of the United States Patent and Trademark Office*